(12) United States Patent
Hu et al.

(10) Patent No.: US 11,960,761 B2
(45) Date of Patent: Apr. 16, 2024

(54) MEMORY CONTROL METHOD, MEMORY STORAGE DEVICE AND MEMORY CONTROL CIRCUIT UNIT

(71) Applicant: PHISON ELECTRONICS CORP., Miaoli (TW)

(72) Inventors: Chun-Yang Hu, Miaoli County (TW); Yi-Tein Hung, Pingtung County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 38 days.

(21) Appl. No.: 17/118,605

(22) Filed: Dec. 11, 2020

(65) Prior Publication Data

US 2022/0164133 A1 May 26, 2022

(30) Foreign Application Priority Data

Nov. 25, 2020 (TW) ................................. 109141301

(51) Int. Cl.
*G06F 12/00* (2006.01)
*G06F 3/06* (2006.01)

(52) U.S. Cl.
CPC .......... *G06F 3/0656* (2013.01); *G06F 3/0619* (2013.01); *G06F 3/0653* (2013.01); *G06F 3/0659* (2013.01); *G06F 3/0679* (2013.01)

(58) Field of Classification Search
CPC ............... G06F 3/0656; G06F 12/0246; G06F 12/0804; G06F 2212/202; G06F 3/0679; G06F 3/0659
USPC ......................................................... 711/154
See application file for complete search history.

(56) References Cited

U.S. PATENT DOCUMENTS

| 9,106,265 | B2* | 8/2015 | Nicolas | H04L 1/0071 |
| 9,430,114 | B1* | 8/2016 | Dingman | G06F 16/25 |
| 9,639,589 | B1* | 5/2017 | Theimer | G06F 21/00 |
| 10,067,898 | B2* | 9/2018 | Chiang | G06F 13/385 |
| 10,083,100 | B1* | 9/2018 | Agetsuma | G06F 11/2094 |
| 11,640,262 | B2* | 5/2023 | Helm | G06F 3/0673 |
| | | | | 711/154 |
| 2006/0253496 | A1* | 11/2006 | Hunter | G06F 16/80 |
| 2009/0327343 | A1* | 12/2009 | McCormack | G06F 16/258 |
| 2014/0140142 | A1* | 5/2014 | Ko | G11C 7/10 |
| | | | | 365/185.29 |
| 2015/0279464 | A1* | 10/2015 | Herhut | G06F 12/0276 |
| | | | | 711/103 |
| 2016/0294709 | A1* | 10/2016 | Xu | H04L 49/9063 |

(Continued)

*Primary Examiner* — Mohamed M Gebril
(74) *Attorney, Agent, or Firm* — JCIPRNET (57) ABSTRACT

A memory control method is disclosed according to an embodiment. The method includes: temporarily storing first type data into a buffer memory, wherein the first type data is preset to be stored into a rewritable non-volatile memory module based on a first programming mode; in a state that the first type data is stored in the buffer memory, temporarily storing second type data into the buffer memory, and the second type data is preset to be stored into the rewritable non-volatile memory module based on a second programming mode different from the first programming mode; and in a state that a data volume of the first type data in the buffer memory does not reach a first threshold, if a data volume of the second type data in the buffer memory reaches a second threshold, storing the first type data in the buffer memory into the rewritable non-volatile memory module.

30 Claims, 8 Drawing Sheets

(56) References Cited

U.S. PATENT DOCUMENTS

| | | | | |
|---|---|---|---|---|
| 2016/0371145 A1* | 12/2016 | Akutsu | .................... | G06F 3/067 |
| 2017/0286309 A1* | 10/2017 | Danilov | ................ | G06F 3/0656 |
| 2017/0293697 A1* | 10/2017 | Youshi | .................... | G06F 16/84 |
| 2018/0276114 A1* | 9/2018 | Kodama | ............... | G06F 3/0619 |
| 2019/0310925 A1* | 10/2019 | Yoshida | ................ | G06F 3/065 |
| 2020/0210291 A1* | 7/2020 | Yamamoto | .......... | G06F 11/1076 |
| 2020/0301612 A1* | 9/2020 | Jin | ........................ | G06F 3/0659 |
| 2020/0393995 A1* | 12/2020 | Jung | ....................... | G06F 3/061 |
| 2021/0255805 A1* | 8/2021 | Harata | .................. | H04L 12/403 |
| 2022/0164133 A1* | 5/2022 | Hu | ..................... | G06F 12/0246 |
| 2022/0350510 A1* | 11/2022 | Tsukioka | ............ | G06F 11/2089 |

\* cited by examiner

MEMORY CONTROL METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 109141301, filed on Nov. 25, 2020. The entirety of the above-mentioned patent application is hereby incorporated by reference herein and made a part of this specification.

BACKGROUND

1. Technology Field

The invention relates to a memory control technique, and more particularly, to a memory control method, a memory storage device and a memory control circuit unit.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

In general, data from a host system will be temporarily stored in a buffer memory first. When the amount of to-be-stored data in the buffer memory matches the amount of data corresponding to one basic write data unit, the to-be-stored data in the buffer memory can be stored into the rewritable non-volatile memory module based on this basic write data unit. For example, assuming that the amount of data corresponding to the basic write data unit is 16 kilobytes (KB), it means that each data writing for the rewritable non-volatile memory module is in a unit of 16 KB. However, in some cases, the data in the buffer memory that has not yet met the writing condition may be accidentally lost due to sudden power failure. In particular, for memory storage devices that support multi-stream writing, the data received early may be eventually lost due to power failure because of the delay in meeting the writing condition, and the total amount of lost data may even exceed expectation.

SUMMARY

The invention provides a memory control method, a memory storage device and a memory control circuit unit, which are capable of solving the problems described above and improving a management efficiency of caching data.

An exemplary embodiment of the invention provides a memory control method used in a memory storage device. The memory storage device includes a buffer memory and a rewritable non-volatile memory module. The memory control method includes: temporarily storing first type data into a first storage space in the buffer memory, wherein the first type data is preset to be stored into the rewritable non-volatile memory module based on a first programming mode; in a state that the first type data is stored in the buffer memory, temporarily storing second type data into a second storage space in the buffer memory, wherein the second type data is preset to be stored into the rewritable non-volatile memory module based on a second programming mode, and the first programming mode is different from the second programming mode; and in a state that a data volume of the first type data in the buffer memory does not reach a first threshold, if a data volume of the second type data in the buffer memory reaches a second threshold, storing the first type data in the buffer memory into the rewritable non-volatile memory module, wherein the first threshold is less than the second threshold.

An exemplary embodiment of the invention further provides a memory storage device, which includes a connection interface unit, a rewritable non-volatile memory module and a memory control circuit unit. The connection interface unit is configured to couple to a host system. The memory control circuit unit is coupled to the connection interface unit and the rewritable non-volatile memory module. The memory control circuit unit is configured to temporarily store first type data into a first storage space in the buffer memory, and the first type data is preset to be stored into a rewritable non-volatile memory module based on a first programming mode. In a state that the first type data is stored in the buffer memory, the memory control circuit unit is further configured to temporarily store second type data into a second storage space in the buffer memory, wherein the second type data is preset to be stored into the rewritable non-volatile memory module based on a second programming mode, and the first programming mode is different from the second programming mode. In a state that a data volume of the first type data in the buffer memory does not reach a first threshold, if a data volume of the second type data in the buffer memory reaches a second threshold, the memory control circuit unit is further configured to send a write command sequence to store the first type data in the buffer memory into the rewritable non-volatile memory module, wherein the first threshold is less than the second threshold.

An exemplary embodiment of the disclosure further provides a memory control circuit unit, which is configured to control a rewritable non-volatile memory module. The memory control circuit unit includes a host interface, a memory interface, a buffer memory and a memory management circuit. The host interface is configured to couple to a host system. The memory interface is configured to couple to the rewritable non-volatile memory module. The memory management circuit is coupled to the host interface, the memory interface and the buffer memory. The memory management circuit is further configured to send a write command sequence to store the first type data in the buffer memory into the rewritable non-volatile memory module, and the first type data is preset to be stored into a rewritable non-volatile memory module based on a first programming mode; In a state that the first type data is stored in the buffer memory, the memory management circuit is further configured to temporarily store second type data into a second storage space in the buffer memory, wherein the second type data is preset to be stored into the rewritable non-volatile memory module based on a second programming mode, and the first programming mode is different from the second programming mode. In a state that a data volume of the first type data in the buffer memory does not reach a first threshold, if a data volume of the second type data in the buffer memory reaches a second threshold, the memory management circuit is further configured to send a write command sequence to store the first type data in the buffer memory into the rewritable non-volatile memory module, wherein the first threshold is less than the second threshold.

Based on the above, the first type data is preset to be stored into a rewritable non-volatile memory module based on a first programming mode. The second type data is preset to be stored into a rewritable non-volatile memory module based on a second programming mode. The first programming mode is different from the second programming mode. In a state that the first type data and the second type data are temporarily stored in the buffer memory, if the data volume of the first type data does not reach the first threshold and the data volume of the second type data reaches the second threshold, the first type data in the buffer memory may be (directly) stored into the rewritable non-volatile memory module, wherein the first threshold is less than the second threshold. In this way, the probability of accidental loss of the data received earlier can be reduced and/or the total volume of data that may be lost due to unexpected power failure can be reduced so as to improve the management efficiency of caching data.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Embodiments of the disclosure may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 1:
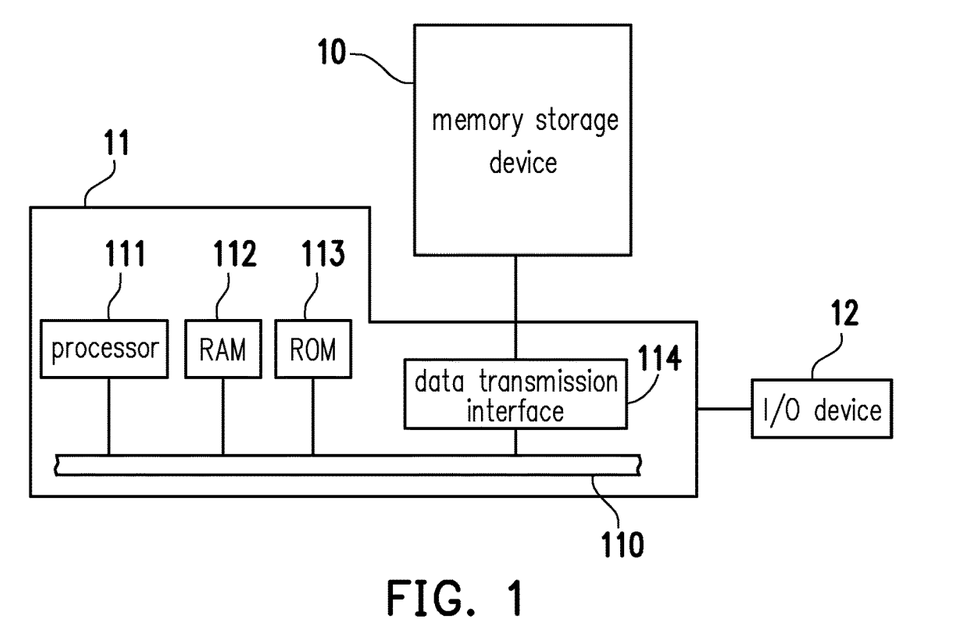
FIG. 1 is a schematic diagram illustrating a host system, a memory storage device and an I/O (input/output) device according to an exemplary embodiment of the disclosure.
Figure 2:
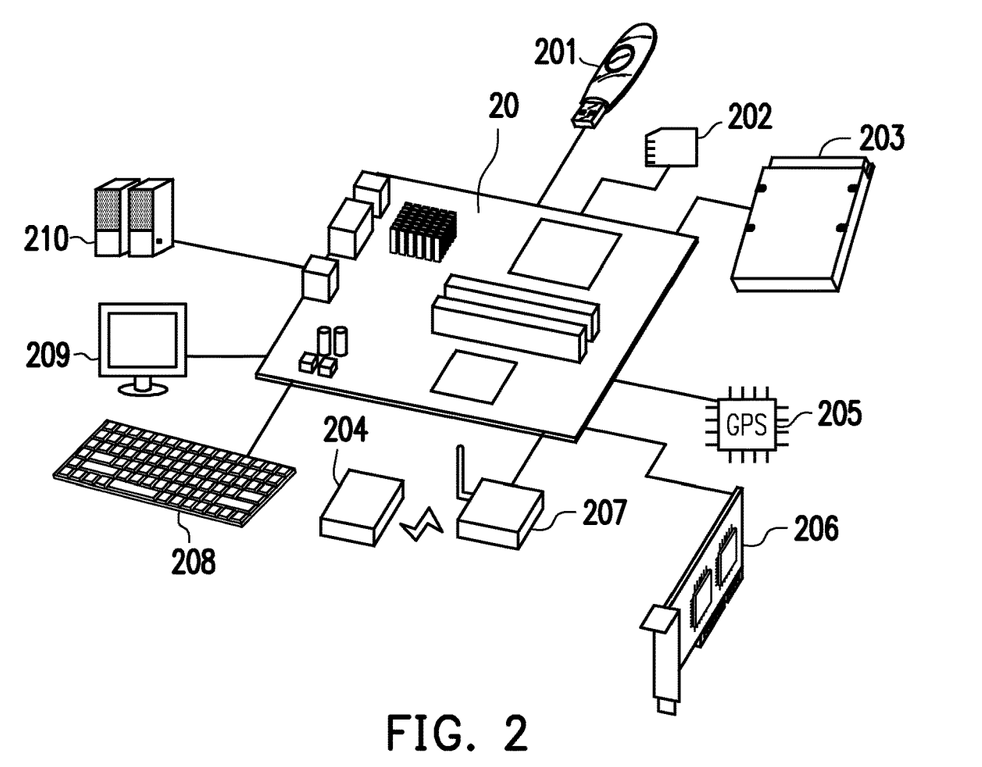
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
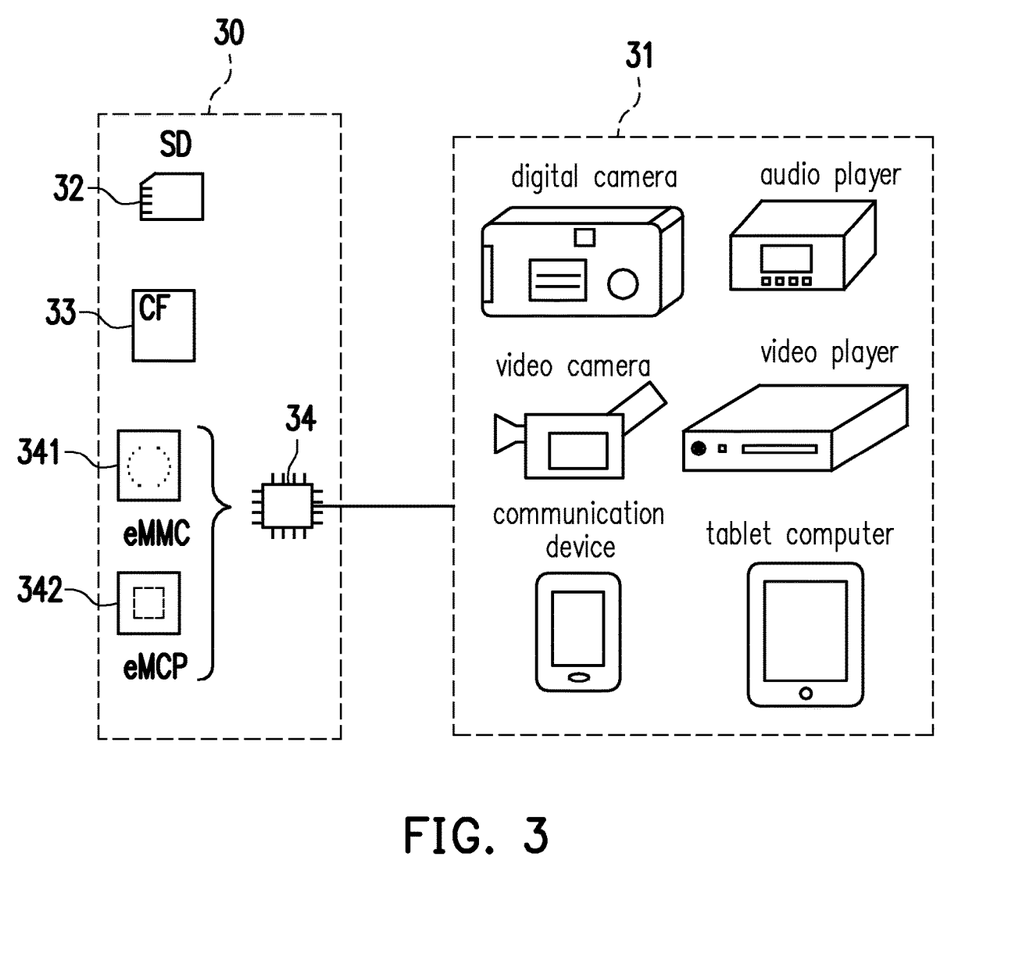
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the invention. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
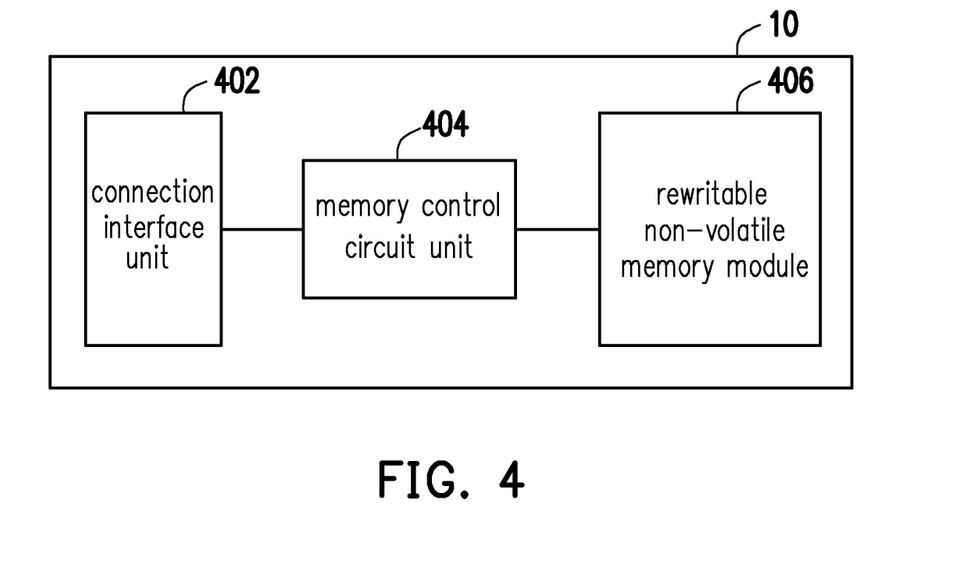
FIG. 4 is a schematic block diagram illustrating a memory storage device according to an exemplary embodiment of the invention.

FIG. 4 is a schematic block diagram illustrating a memory storage device according to an exemplary embodiment of the invention. Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In this exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a Quad Level Cell (MLC) NAND-type flash memory module (i.e., a flash memory module capable of storing four bits in one memory cell), other flash memory modules or other memory modules having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". With changes in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 may constitute a plurality of physical programming units, and the physical programming units can constitute a plurality of physical erasing units. Specifically, the memory cells on the same word line may constitute one or more of the physical programming units. If each of the memory cells can store two or more bits, the physical programming units on the same word line may be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units may include a data bit area and a redundancy bit area. The data bit area contains multiple physical sectors configured to store user data, and the redundant bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
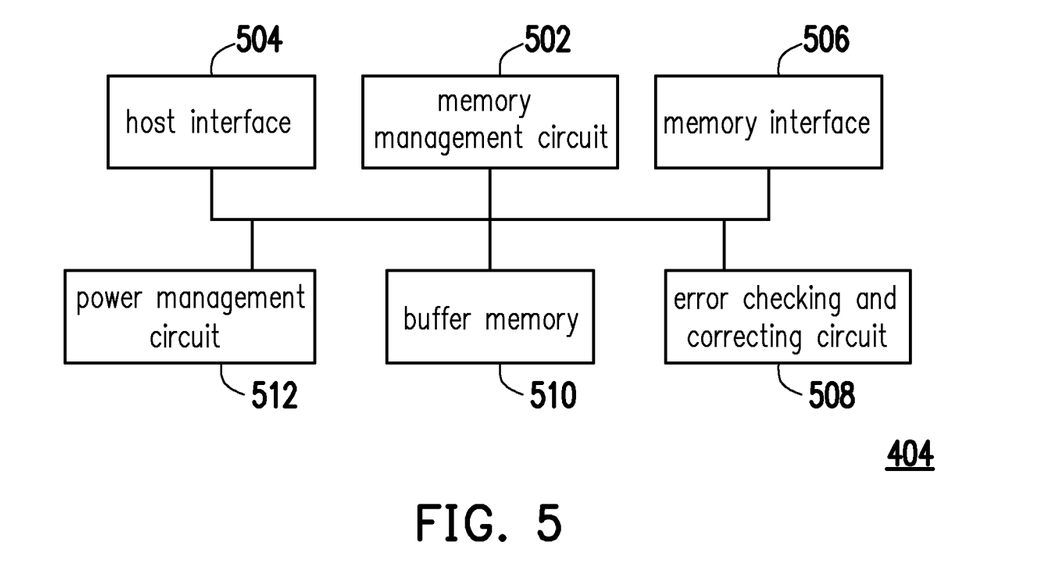
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure. Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. When the memory storage device 10 operates, the control commands are executed by the microprocessor to execute operations of writing, reading or erasing data.

In another exemplary embodiment, the control commands of the memory management circuit 502 may also be stored as program codes in a specific area (e.g., the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to issue a write command sequence for the rewritable non-volatile memory module 406 to write data into the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. Nevertheless, it should be understood that the invention is not limited in this regard. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence instructing a writing of data, the read command sequence instructing a reading of data, the erase command sequence instructing an erasing of data, and other corresponding command sequences instructing various memory operations (e.g., changing read voltage levels or performing a garbage collection procedure). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence;

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to execute an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In an exemplary embodiment, the rewritable non-volatile memory module 406 of FIG. 4 is also known as a flash memory module; the memory control circuit unit 404 is also known as a flash memory controller for controlling the flash memory module; and/or the memory management circuit 502 of FIG. 5 is also known as a flash memory management circuit.

Figure 6:
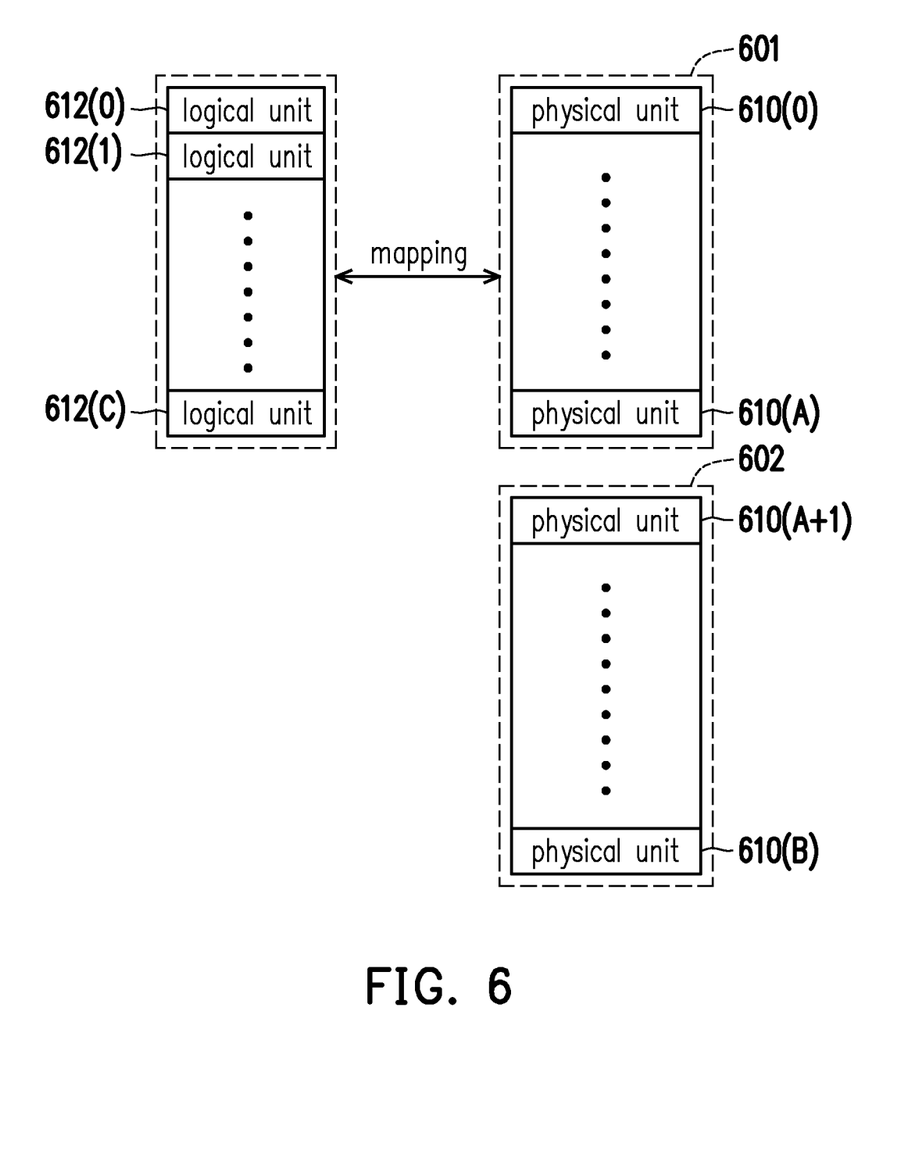
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure. Referring to FIG. 6, the memory management circuit 502 logically groups physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is regarded as a damaged physical unit. It should be noted that, if there are no available physical erasing units in the replacement area 602, the memory management circuit 502 may declare the memory storage device 10 as in a write protect state so data can no longer be written thereto.

In this exemplary embodiment, each physical unit refers to one physical programming unit. However, in another exemplary embodiment, one physical unit may also refer to one physical address, one physical erasing unit, or a composition of a plurality of continuous or discontinuous physical addresses. The memory management circuit 502 assigns logical units 612(0) to 612(C) for mapping to the physical units 610(0) to 610(A) in the storage area 601. In this exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

In an exemplary embodiment, the memory management circuit 502 can record a mapping relation (a.k.a. a logical-physical address mapping relation) between the logical units and the physical units into at least one logical-physical address mapping table. When the host system 11 intends to read the data from the memory storage device 10 or write the data into the memory storage device 10, the memory management circuit 502 can perform a data accessing operation on the memory storage device 10 according to the logical-physical address mapping table.

In an exemplary embodiment, the memory management circuit 502 may receive a write command from the host system 11. The write command instructs a storing of data belonging to one specific logical unit. The memory management circuit 502 can obtain a type of to-be-stored data and temporarily store the data into the buffer memory 510. It should be noted that, the data temporarily stored in the buffer memory 510 can include first type data and second type data.

In an exemplary embodiment, the memory management circuit 502 can determine whether one to-be-stored data belongs to the first type data or the second type data according to a logical unit to which the data belongs. For example, if the logical unit to which the to-be-stored data belongs falls in a specific logical range (a.k.a. a first logical range), the memory management circuit 502 can determine that the data belongs to the first type data. Alternatively, if the logical unit to which the to-be-stored data belongs falls in another logical range (a.k.a. a second logical range), the memory management circuit 502 can determine that the data belongs to the second type data. The first logical range may be different from the second logical range.

In an exemplary embodiment, the first type data refers to data preset to be stored into the rewritable non-volatile memory module 406 based on a specific programming mode (a.k.a. a first programming mode). The second type data refers to data preset to be stored into the rewritable non-volatile memory module 406 based on another programming mode (a.k.a. a second programming mode). The first programming mode is different from the second programming mode.

In an exemplary embodiment, the first programming mode is configured to store P bits into one memory cell in the rewritable non-volatile memory module 406, and the second programming mode is configured to store Q bits into one memory cell in the rewritable non-volatile memory module 406. Both P and Q are positive integers, and P is not equal to Q.

In an exemplary embodiment, the first programming mode refers to one of a SLC programming mode, a pseudo SLC programming mode, a lower physical programming mode, a mixture programming mode and a less layer memory cell mode. In the SLC programming mode and the pseudo SLC programming mode, one memory cell only stores one bit of data. In the lower physical programming mode, the lower physical programming units are programmed, and upper physical programming units corresponding to the lower physical programming units may not be programmed. In the mixture programming mode, valid data (or real data) is programmed into lower physical programming units, and dummy data is programmed into upper physical programming units corresponding to the lower physical programming units sorted with the valid data at the same time. In the less layer memory cell mode, one memory cell stores data with a first number of bits. For example, the first number may be set to "1".

In an exemplary embodiment, the second programming mode refers to a MLC programming mode, a TLC programming mode a QLC programming mode or other similar modes. In the second programming mode, one memory cell can store a second number of bits of data, where the second number is equal to or greater than "2". For example, the second number may be set to "2", "3" or "4". In another exemplary embodiment, the first number in the first programming mode and the second number in the second programming mode may be other numbers as long as the second number is greater than the first number.

In an exemplary embodiment, P is less than Q. For example, P may be "1", and Q may be "2", "3" or "4".

Figure 7:
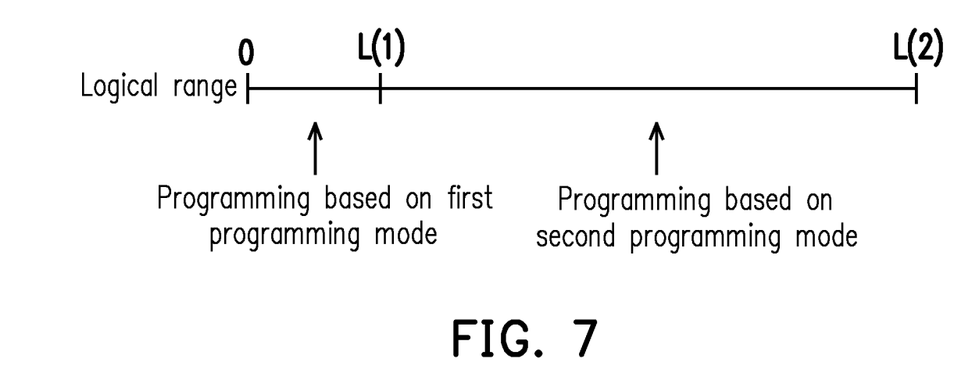
FIG. 7 is a schematic diagram illustrating data stored by a specific programming mode determined based on a logical range of the data according to an exemplary embodiment of the invention.

FIG. 7 is a schematic diagram illustrating data stored by a specific programming mode determined based on a logical range of the data according to an exemplary embodiment of the invention. Referring to FIG. 7, it is assumed that a logical range covered by all logical units (e.g., the logical units 612(0) to 612(C) of FIG. 6) is divided into logical ranges 0 to L(1) and L(1) to L(2). The logical range 0 to L(1) may be regarded as a first logical range. The logical range L(1) to L(2) may be regarded as a second logical range. In an exemplary embodiment, taking a total logical range of 1 TB as an example, the logical range 0 to L(1) can refer to a logical range between 0 and 100 GB, and the logical range L(1) to L(2) can refer to a logical range between 100 GB and 1 TB. However, in another exemplary embodiment, the division of the logical range can be adjusted according to practical requirements.

In an exemplary embodiment, if a logical unit to which one specific to-be-stored data belongs falls in the logical range 0 to L(1), the memory management circuit 502 can determine that this data belongs to the first type data and then program this data based on the first programming mode. Alternatively, in an exemplary embodiment, if a logical unit to which one specific to-be-stored data belongs falls in the logical range L(1) to L(2), the memory management circuit 502 can determine that this data belongs to the second type data and then program this data based on the second programming mode.

In an exemplary embodiment, the memory management circuit 502 can continuously determine whether a data volume of the first type data or the second type data in the buffer memory 510 reaches a specific threshold (a.k.a. a first threshold). The first threshold corresponds to a basic write data unit of the rewritable non-volatile memory module 406. For example, assuming that a single data writing specified by the basic write data unit is in a unit of 16 KB, the first threshold may be 16 KB. In an exemplary embodiment, the basic data write unit can correspond to a capacity of one physical unit (e.g., one physical programming unit).

In an exemplary embodiment, if the data volume of the first type data in the buffer memory 510 reaches the first threshold, the memory management circuit 502 can send a write command sequence to the rewritable non-volatile memory module 406 to instruct the rewritable non-volatile memory module 406 to store the first type data with the data volume reaching the first threshold in the buffer memory 510 based on the first programming mode. Alternatively, in an exemplary embodiment, if the data volume of the second type data in the buffer memory 510 reaches the first threshold, the memory management circuit 502 can send a write command sequence to the rewritable non-volatile memory module 406 to instruct the rewritable non-volatile memory module 406 to store the second type data with the data volume reaching the first threshold in the buffer memory 510 based on the second programming mode.

In an exemplary embodiment, if the data volume of the first type data in the buffer memory 510 does not reach the first threshold, the memory management circuit 502 can temporarily keep the first type data in the buffer memory 510 without storing the first type data in the buffer memory 510 into the rewritable non-volatile memory module 406. Alternatively, in an exemplary embodiment, if the data volume of the second type data in the buffer memory 510 does not reach the first threshold, the memory management circuit 502 can temporarily keep the second type data in the buffer memory 510 without storing the second type data in the buffer memory 510 into the rewritable non-volatile memory module 406.

Figure 8:
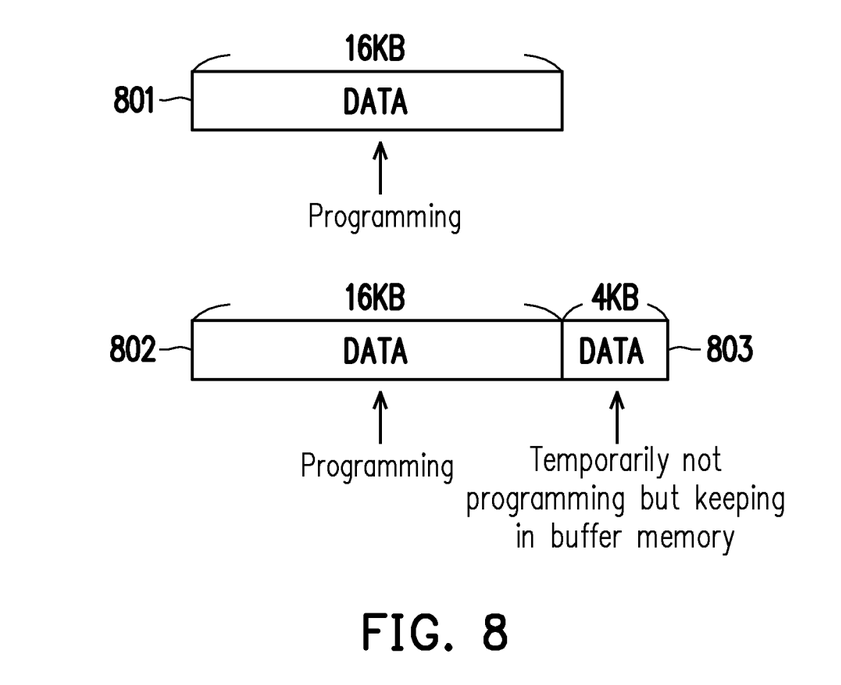
FIG. 8 is a schematic diagram of determining whether to program data based on a data volume according to an exemplary embodiment of the invention.

FIG. 8 is a schematic diagram of determining whether to program data based on a data volume according to an exemplary embodiment of the invention. Referring to FIG. 8, it is assumed that the first threshold is 16 KB. If a data volume of data 801 (which may be the first type data or the second type data) in the buffer memory 510 reaches 16 KB, the data 801 may be programmed into the rewritable non-volatile memory module 406. However, if a data volume of a part of data 802 in another data (which may be the first type data or the second type data) reaches 16 KB but a data volume of another part of data 803 (e.g., 4 KB) does not reach 16 KB, only the data 802 can be programmed, and the data 803 needs to be temporarily kept in the buffer memory 510 without being programmed.

It should be noted that, in the foregoing exemplary embodiment, whether the data volume is greater than the first threshold is determined by comparing a total data volume of the same type of data in the buffer memory 510 with the first threshold instead of comparing a total data volume of mixed types of data with the first threshold. That is, in an exemplary embodiment, it is assumed that the data volume of the first type data in the buffer memory 510 is 8 KB and the data volume of the second type data is 12 KB. Although the sum of the data volume of the first type data and the data volume of the second type data (e.g., 20 KB) is greater than the first threshold (e.g., 16 KB), none of the data volume of the first type data and the data volume of the second type reaches the first threshold. Therefore, neither the first type data nor the second type data in the buffer memory 510 will be programmed into the rewritable non-volatile memory module 406.

In an exemplary embodiment, the memory management circuit 502 can temporarily store the first type data into a specific storage space (a.k.a. a first storage space) in the buffer memory 510. In a state that the first type data is stored in the buffer memory 510, the memory management circuit 502 can temporarily store the second type data into another storage space (a.k.a. a second storage space) in the buffer memory 510 at the same time and store the second type data reaching the first threshold in the buffer memory 510 into the rewritable non-volatile memory module 406. For example, the second type data with the data volume greater than the first threshold in the buffer memory 510 can be continuously programmed into the rewritable non-volatile memory module 406 based on the second programming mode. It should be noted that the first storage space and the second storage space do not overlap with each other. Therefore, the first type data and the second type data in the buffer memory 510 can coexist without overwriting each other.

In an exemplary embodiment, in a state that the data volume of the first type data in the buffer memory 510 does not reach the first threshold, if the data volume of the second type data in the buffer memory 510 reaches another threshold (a.k.a. a second threshold), the memory management circuit 502 can store the first type data in the buffer memory 510 into the rewritable non-volatile memory module 406. In other words, in an exemplary embodiment, even if the data volume of the first type data in the buffer memory 510 does not reach the first threshold, as long as the data volume of the second type data in the buffer memory 510 reaches the second threshold, the memory management circuit 502 can directly program the first type data in the buffer memory 510 into the rewritable non-volatile memory module 406 based on the first programming mode. The second threshold is greater than the first threshold.

Figure 9:
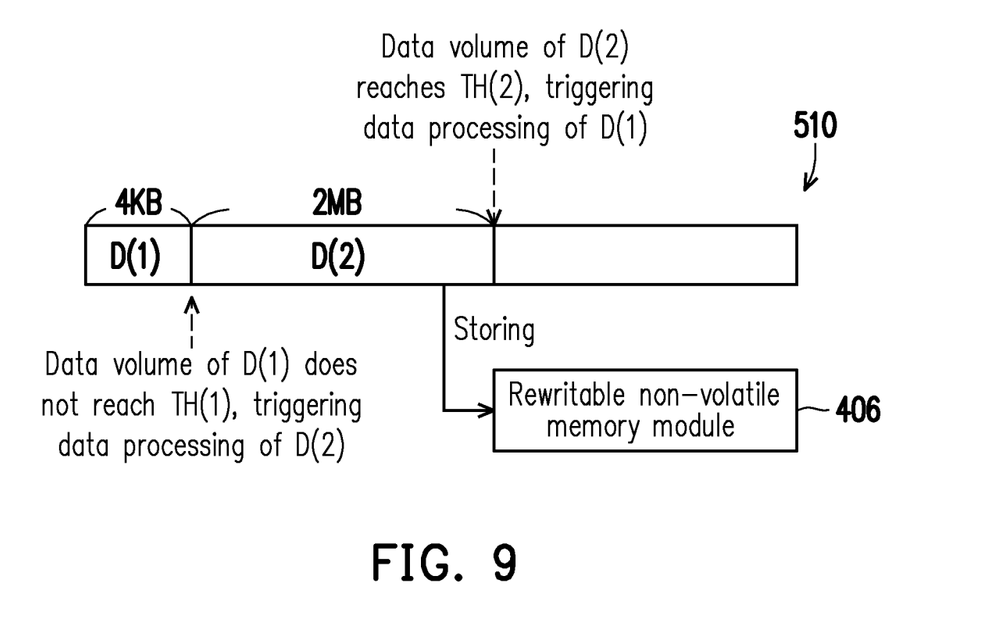
FIG. 9 and FIG. 10 are schematic diagrams illustrating management of data in a buffer memory according to an exemplary embodiment of the invention.
Figure 10:
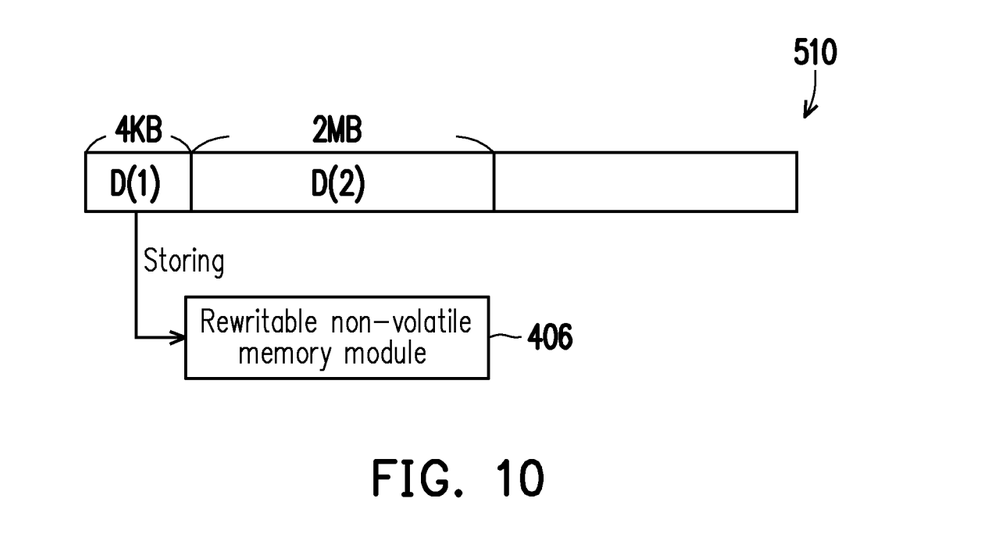

FIG. 9 and FIG. 10 are schematic diagrams illustrating management of data in a buffer memory according to an exemplary embodiment of the invention. Referring to FIG. 9, it is assumed that first type data D(1) is first stored into the buffer memory 510 and a data volume of the first type data D(1) (e.g., 4 KB) does not reach a first threshold TH(1). After that, second type data D(2) is received and also stored into the buffer memory 510. While the second type data D(2) is being received, the second type data that meets a writing condition (i.e., the condition that the data volume is greater than the first threshold TH(1)) can be continuously stored into the rewritable non-volatile memory module 406.

At a certain point in time, a data volume (e.g., 2 MB) of the second type data D(2) in the buffer memory 510 reaches a second threshold TH(2). In response to the data volume of the second type data D(2) reaching the second threshold TH(2), a data sorting of the first type data D(1) can be triggered. In response to the data sorting of the first type data D(1) being triggered, the first type data D(1) in the buffer memory 510 can be directly stored into the rewritable non-volatile memory module 406, as shown in FIG. 10. At this time, the stored first type data D(1) may not meet a preset writing condition (i.e., the condition that the data volume is greater than the first threshold TH(1)).

In the exemplary embodiment of FIG. 9 and FIG. 10, when a certain amount of the second type data D(2) is accumulated in the buffer memory 510 (instead of the buffer memory 510 being fully written), the data sorting of the first type data D(1) is triggered so the probability of accidental loss of the first type data D(1) received earlier due to sudden power failure can be reduced.

In an exemplary embodiment, after the data sorting of the first type data D(1) is triggered and before the first type data D(1) in the buffer memory 510 is completely stored into the rewritable non-volatile memory module 406, the new second type data D(2) can be continuously temporarily stored in the unused space in the buffer memory 510. Nonetheless, after the data sorting of the first type data D(1) is triggered and before the first type data D(1) in the buffer memory 510 is completely stored in the rewritable non-volatile memory module 406, the second type data D(2) can be temporarily stored into the rewritable non-volatile memory module 406 to avoid interfering with the storage of the first type data D(1) and/or to speed up the storage of the first type data D(1).

In an exemplary embodiment, the memory management circuit 502 can determine the second threshold according to a capacity (i.e., a total capacity) of the buffer memory 510. For example, the memory management circuit 502 can determine the second threshold according to according to half of the capacity of the buffer memory 510 or other proportional values. Taking FIG. 9 as an example, assuming that the capacity of the buffer memory 510 is 4 MB, the memory management circuit 502 can determine the second threshold TH(2) to be 2 MB according to half of the capacity of the buffer memory 510.

In the exemplary embodiment of FIG. 9, in a state that the data volume of the first type data D(1) in the buffer memory 510 does not reach the first threshold TH(1), if the data volume of the second type data D(2) in the buffer memory 510 does not reach the second threshold TH(2) (i.e., before the data sorting of the first type data D(1) is triggered), the memory management circuit 502 can keep the first type data D(1) in the buffer memory 510 without storing the first type data D(1) in the buffer memory 510 into the rewritable non-volatile memory module 406. However, if the data volume of the first type data D(1) in the buffer memory 510 reaches the first threshold TH(1), the memory management circuit 502 can store the first type data D(1) in the buffer memory 510 into the rewritable non-volatile memory module 406.

Figure 11:
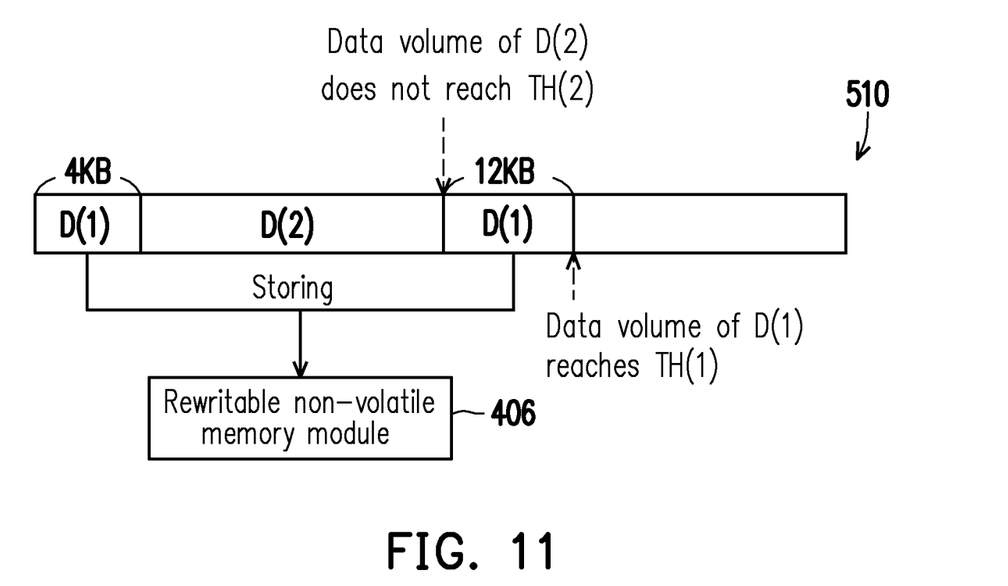
FIG. 11 is a schematic diagram illustrating management of data in a buffer memory according to an exemplary embodiment of the invention.

FIG. 11 is a schematic diagram illustrating management of data in a buffer memory according to an exemplary embodiment of the invention. Referring to FIG. 11, in an exemplary embodiment, in a state that the first type data D(1) and the second type data D(2) are stored in the buffer memory 510, if the accumulated data volume (i.e., a total data volume) of the first type data D(1) reaches the first threshold TH(1) (e.g., 16 KB), the memory management circuit 502 can store the first type data D(1) in the buffer memory 510 into the rewritable non-volatile memory module 406. At this time, the data volume of the second type data D(2) in the buffer memory 510 may not reach the second threshold TH(2) yet.

It should be noted that, in the foregoing exemplary embodiment, in response to the data volume of the first type data D(1) in the buffer memory 510 reaching the first threshold TH(1), the first type data D(1) in the buffer memory 510 can be stored into the rewritable non-volatile memory module 406. In addition, in response to the data volume of the second type data D(2) in the buffer memory 510 reaching the second threshold TH(2), the data sorting of the first type data D(1) can also be triggered to temporarily store the first type data D(1) in the buffer memory 510 into the rewritable non-volatile memory module 406. In this way, the probability of accidental loss of the first type data D(1) received earlier due to sudden power failure can be effectively reduced.

In an exemplary embodiment, after using the data management mechanism proposed in the foregoing exemplary embodiment, when the memory storage device 10 is powered off without warning, regardless of whether the first type data D(1) in the buffer memory 510 is already stored in the rewritable non-volatile memory module 406, the total volume of data that may be lost in the buffer memory 510 can be controlled within a reasonable range so as to improve an execution efficiency of subsequent error processing or power recovery.

Figure 12:
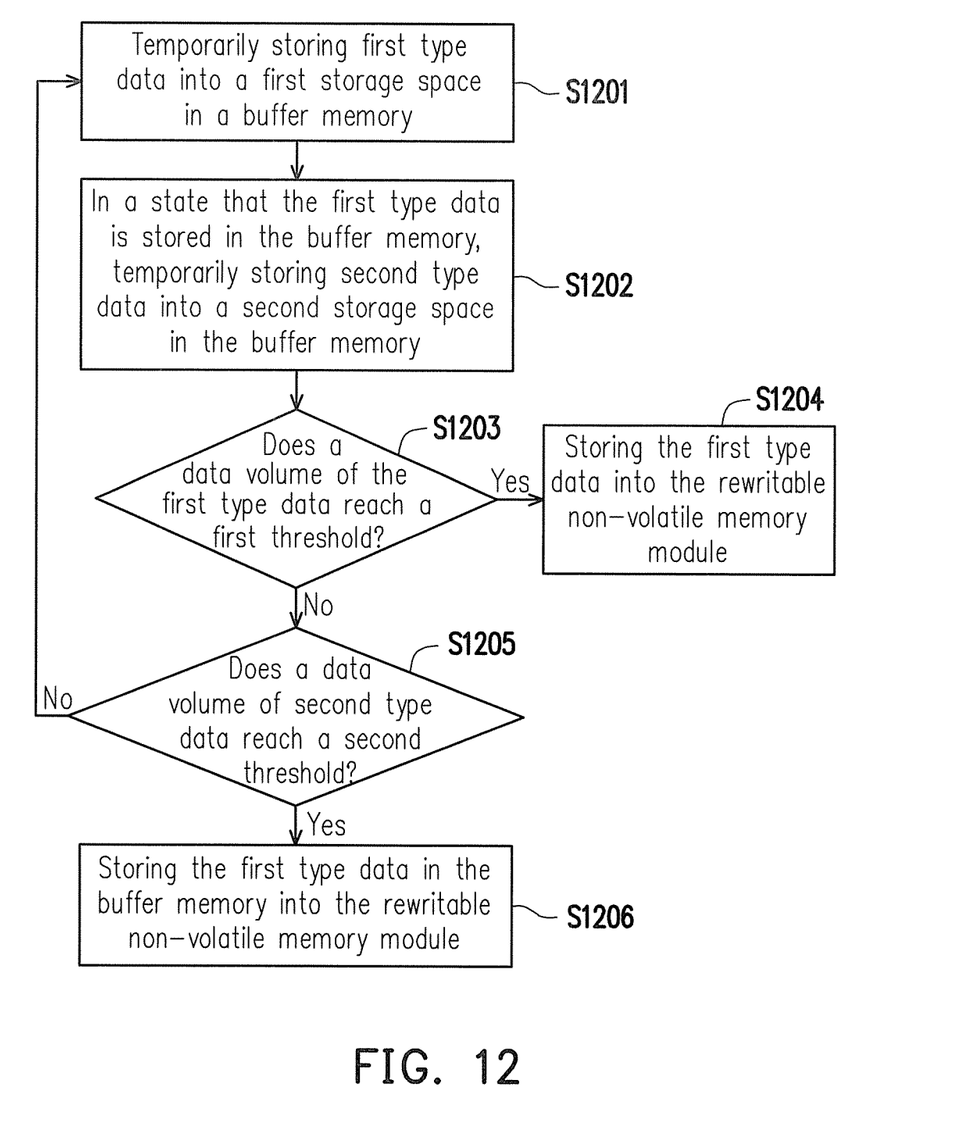
FIG. 12 is a flowchart illustrating a memory control method according to an exemplary embodiment of the invention.

FIG. 12 is a flowchart illustrating a memory control method according to an exemplary embodiment of the invention. Referring to FIG. 12, in step S1201, first type data is temporarily stored into a first storage space in the buffer memory, wherein the first type data is preset to be stored into a rewritable non-volatile memory module based on a first programming mode. In step S1202, in a state that the first type data is stored in the buffer memory, second type data is temporarily stored into a second storage space in the buffer memory, wherein the second type data is preset to be stored into the rewritable non-volatile memory module based on a second programming mode, and the first programming mode is different from the second programming mode. In step S1203, whether a data volume of the first type data reaches a first threshold is determined. If the data volume of the first type data reaches the first threshold, in step S1204, the first type data is stored into the rewritable non-volatile memory module. If the data volume of the first type data does not reach the first threshold, in step S1205, whether a data volume of the second type data reaches a second threshold is determined. If the data volume of the second type data reaches the second threshold, in step S1206, the first type data in the buffer memory is stored into the rewritable non-volatile memory module, wherein the first threshold is less than the second threshold. In addition, if the data volume of the second type data does not reach the second threshold, the method can return to step S1201 (or S1202).

Nevertheless, steps depicted in FIG. 12 are described in detail as above so that related description thereof is omitted hereinafter. It should be noted that, the steps depicted in FIG. 12 may be implemented as a plurality of program codes or circuits, which are not particularly limited in the disclosure. Moreover, the method disclosed in FIG. 12 may be implemented by reference with above exemplary embodiments, or may be implemented separately, which are not particularly limited in the invention.

In summary, in a memory storage device with multi-stream writing in which multiple programming modes (e.g., SLC and QLC) coexist, by monitoring the data volume of the second type data in the buffer memory and additionally triggering the data managing of the first type data, the probability of accidental loss of the data received earlier can be reduced and/or the total volume of data that may be lost due to unexpected power failure can be reduced. In this way, the management efficiency of caching data can be effectively improved.

The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory control method for a memory storage device, wherein the memory storage device comprises a buffer memory and a rewritable non-volatile memory module, and the memory control method comprises:
    temporarily storing first type data into a first storage space in the buffer memory, and determining, based on a first logical unit of the first type data, that the first type data should be stored into the rewritable non-volatile memory module by a first programming mode;
    in a first state that the first type data is stored in the buffer memory, temporarily storing second type data into a second storage space in the buffer memory, and determining, based on a second logical unit of the second type data, that the second type data should be stored into the rewritable non-volatile memory module by a second programming mode, and the first programming mode is different from the second programming mode;
    determining whether a data volume of the first type data in the buffer memory reaches a first threshold, and determining whether a data volume of the second type data in the buffer memory reaches a second threshold, wherein the first threshold is less than the second threshold; and
    in a second state that the data volume of the first type data in the buffer memory does not reach the first threshold and the data volume of the second type data in the buffer memory reaches the second threshold, storing the first type data in the buffer memory into the rewritable non-volatile memory module.

2. The memory control method of claim 1, further comprising:
    receiving a write command from a host system, wherein the write command instructs a storing of data belonging to a specific logical unit; and
    determining whether the data belongs to the first type data or the second type data according to the specific logical unit.

3. The memory control method of claim 1, wherein the first programming mode is configured to store P bits into one memory cell in the rewritable non-volatile memory module, and the second programming mode is configured to store Q bits into one memory cell in the rewritable non-volatile memory module, both P and Q are positive integers, and P is not equal to Q.

4. The memory control method of claim 3, wherein P is less than Q.

5. The memory control method of claim 1, wherein the first threshold corresponds to a basic write data unit of the rewritable non-volatile memory module.

6. The memory control method of claim 1, further comprising:
    determining the second threshold according to a capacity of the buffer memory.

7. The memory control method of claim 1, further comprising:
    in a third state that the data volume of the first type data in the buffer memory does not reach the first threshold and the data volume of the second type data in the buffer memory does not reach the second threshold, keeping the first type data in the buffer memory without storing the first type data in the buffer memory into the rewritable non-volatile memory module.

8. The memory control method of claim 1, further comprising:
    if the data volume of the first type data in the buffer memory reaches the first threshold, storing the first type data in the buffer memory into the rewritable non-volatile memory module.

9. A memory storage device, comprising:
    a connection interface unit configured to couple to a host system;
    a rewritable non-volatile memory module; and
    a memory control circuit unit, coupled to the connection interface unit and the rewritable non-volatile memory module,
    wherein the memory control circuit unit is configured to temporarily store first type data into a first storage space in the buffer memory, and determine, based on a first logical unit of the first type data, that the first type data should be stored into the rewritable non-volatile memory module by a first programming mode, and
    in a first state that the first type data is stored in the buffer memory, the memory control circuit unit is further configured to temporarily store second type data into a second storage space in the buffer memory, and determine, based on a second logical unit of the second type data, that the second type data should be stored into the rewritable non-volatile memory module by a second programming mode, and the first programming mode is different from the second programming mode,
    the memory control circuit unit is further configured to determine whether a data volume of the first type data in the buffer memory reaches a first threshold, and determine whether a data volume of the second type data in the buffer memory reaches a second threshold, wherein the first threshold is less than the second threshold, and
    in a second state that the data volume of the first type data in the buffer memory does not reach the first threshold and the data volume of the second type data in the buffer memory reaches the second threshold, the memory control circuit unit is further configured to send a write command sequence to store the first type data in the buffer memory into the rewritable non-volatile memory module, wherein the first threshold is less than the second threshold.

10. The memory storage device of claim 9, wherein the memory control circuit unit is further configured to receive a write command from the host system, the write command instructs a storing of data belonging to a specific logical unit, and the memory control circuit unit is further configured to determine whether the data belongs to the first type data or the second type data according to the specific logical unit.

11. The memory storage device of claim 9, wherein the first programming mode is configured to store P bits into one memory cell in the rewritable non-volatile memory module, and the second programming mode is configured to store Q bits into one memory cell in the rewritable non-volatile memory module, both P and Q are positive integers, and P is not equal to Q.

12. The memory storage device of claim 11, wherein P is less than Q.

13. The memory storage device of claim 9, wherein the memory control circuit unit is further configured to determine the second threshold according to a capacity of the buffer memory.

14. The memory storage device of claim 9, wherein the first threshold corresponds to a basic write data unit of the rewritable non-volatile memory module.

15. The memory storage device of claim 9, wherein in a third state that the data volume of the first type data in the buffer memory does not reach the first threshold and the data volume of the second type data in the buffer memory does not reach the second threshold, the memory control circuit unit is further configured to keep the first type data in the buffer memory without storing the first type data in the buffer memory into the rewritable non-volatile memory module.

16. The memory storage device of claim 9, wherein if the data volume of the first type data in the buffer memory reaches the first threshold, the memory control circuit unit is further configured to send another write command sequence to store the first type data in the buffer memory into the rewritable non-volatile memory module.

17. A memory control circuit unit for controlling a rewritable non-volatile memory module, the memory control circuit unit comprising:

a host interface, configured to couple to a host system,
a memory interface, configured to couple to the rewritable non-volatile memory module;
a buffer memory; and
a memory management circuit, coupled to the host interface, the memory interface and the buffer memory,
wherein the memory management circuit is configured to temporarily store first type data into a first storage space in the buffer memory, and determine, based on a first logical unit of the first type data, that the first type data should be stored into the rewritable non-volatile memory module by a first programming mode, and
in a first state that the first type data is stored in the buffer memory, the memory management circuit is further configured to temporarily store second type data into a second storage space in the buffer memory, and determine, based on a second logical unit of the second type data, that the second type data should be stored into the rewritable non-volatile memory module by a second programming mode, and the first programming mode is different from the second programming mode,
the memory management circuit is further configured to determine whether a data volume of the first type data in the buffer memory reaches a first threshold, and determine whether a data volume of the second type data in the buffer memory reaches a second threshold, wherein the first threshold is less than the second threshold, and in a second state that the data volume of the first type data in the buffer memory does not reach the first threshold and the data volume of the second type data in the buffer memory reaches the second threshold, the memory management circuit is further configured to send a write command sequence to store the first type data in the buffer memory into the rewritable non-volatile memory module, wherein the first threshold is less than the second threshold.

18. The memory control circuit unit of claim 17, wherein the memory management circuit is further configured to receive a write command from the host system, the write command instructs a storing of data belonging to a specific logical unit, and the memory management circuit is further configured to determine whether the data belongs to the first type data or the second type data according to the specific logical unit.

19. The memory control circuit unit of claim 17, wherein the first programming mode is configured to store P bits into one memory cell in the rewritable non-volatile memory module, and the second programming mode is configured to store Q bits into one memory cell in the rewritable non-volatile memory module, both P and Q are positive integers, and P is not equal to Q.

20. The memory control circuit unit of claim 19, wherein P is less than Q.

21. The memory control circuit unit of claim 17, wherein the memory management circuit is further configured to determine the second threshold according to a capacity of the buffer memory.

22. The memory control circuit unit of claim 17, wherein the first threshold corresponds to a basic write data unit of the rewritable non-volatile memory module.

23. The memory control circuit unit of claim 17, wherein in a third state that the data volume of the first type data in the buffer memory does not reach the first threshold and the data volume of the second type data in the buffer memory does not reach the second threshold, the memory management circuit is further configured to keep the first type data in the buffer memory without storing the first type data in the buffer memory into the rewritable non-volatile memory module.

24. The memory control circuit unit of claim 17, wherein if the data volume of the first type data in the buffer memory reaches the first threshold, the memory management circuit is further configured to send another write command sequence to store the first type data in the buffer memory into the rewritable non-volatile memory module.

25. The memory control method of claim 1, wherein the step of storing the first type data in the buffer memory into the rewritable non-volatile memory module comprises:

in response to that the data volume of the first type data in the buffer memory does not reach the first threshold and the data volume of the second type data in the buffer memory reaches the second threshold, storing the first type data in the buffer memory into the rewritable non-volatile memory module.

26. The memory storage device of claim 9, wherein the operation of storing the first type data in the buffer memory into the rewritable non-volatile memory module comprises:

in response to that the data volume of the first type data in the buffer memory does not reach the first threshold and the data volume of the second type data in the buffer memory reaches the second threshold, storing the first type data in the buffer memory into the rewritable non-volatile memory module.

27. The memory control circuit unit of claim 17, wherein the operation of storing the first type data in the buffer memory into the rewritable non-volatile memory module comprises:

in response to that the data volume of the first type data in the buffer memory does not reach the first threshold and the data volume of the second type data in the buffer memory reaches the second threshold, storing the first type data in the buffer memory into the rewritable non-volatile memory module.

28. A memory control method for a memory storage device, wherein the memory storage device comprises a buffer memory and a rewritable non-volatile memory module, and the memory control method comprises:

receiving at least one write command from a host system;
temporarily storing first type data into a first storage space in the buffer memory and temporarily storing second type data into a second storage space in the buffer memory according to the at least one write command;
determining, based on a first logical unit of the first type data, that the first type data should be stored into the rewritable non-volatile memory module by a first programming mode;
determining, based on a second logical unit of the second type data, that the second type data should be stored into the rewritable non-volatile memory module by a second programming mode, and the first programming mode is different from the second programming mode;
determining whether a data volume of the first type data in the buffer memory reaches a first threshold, and determining whether a data volume of the second type data in the buffer memory reaches a second threshold, wherein the first threshold is less than the second threshold; and
in a state that the data volume of the first type data in the buffer memory does not reach the first threshold, triggering an operation to store the first type data from the buffer memory into the rewritable non-volatile memory module in response to that the data volume of the second type data in the buffer memory reaches the second threshold.

29. A memory control circuit unit for controlling a rewritable non-volatile memory module, the memory control circuit unit comprising:

a host interface, configured to couple to a host system,
a memory interface, configured to couple to the rewritable non-volatile memory module;
a buffer memory; and
a memory management circuit, coupled to the host interface, the memory interface and the buffer memory,
wherein the memory management circuit is configured to:
receive at least one write command from the host system;
temporarily store first type data into a first storage space in the buffer memory and temporarily store second type data into a second storage space in the buffer memory according to the at least one write command;
determine, based on a first logical unit of the first type data, that the first type data should be stored into the rewritable non-volatile memory module by a first programming mode;
determine, based on a second logical unit of the second type data, that the second type data should be stored into the rewritable non-volatile memory module by a second programming mode, and the first programming mode is different from the second programming mode;
determine whether a data volume of the first type data in the buffer memory reaches a first threshold, and determine whether a data volume of the second type data in the buffer memory reaches a second threshold, wherein the first threshold is less than the second threshold; and
in a state that the data volume of the first type data in the buffer memory does not reach the first threshold, trigger an operation to store the first type data from the buffer memory into the rewritable non-volatile memory module in response to that the data volume of the second type data in the buffer memory reaches the second threshold.

30. A memory storage device, comprising:
a connection interface unit configured to couple to a host system;
a rewritable non-volatile memory module; and
a memory control circuit unit, coupled to the connection interface unit and the rewritable non-volatile memory module,
wherein the memory control circuit unit is configured to:
receive at least one write command from the host system;
temporarily store first type data into a first storage space in a buffer memory and temporarily store second type data into a second storage space in the buffer memory according to the at least one write command;
determine, based on a first logical unit of the first type data, that the first type data should be stored into the rewritable non-volatile memory module by a first programming mode;
determine, based on a second logical unit of the second type data, that the second type data should be stored into the rewritable non-volatile memory module by a second programming mode, and the first programming mode is different from the second programming mode;
determine whether a data volume of the first type data in the buffer memory reaches a first threshold, and determine whether a data volume of the second type data in the buffer memory reaches a second threshold, wherein the first threshold is less than the second threshold; and
in a state that the data volume of the first type data in the buffer memory does not reach the first threshold, trigger an operation to store the first type data from the buffer memory into the rewritable non-volatile memory module in response to that the data volume of the second type data in the buffer memory reaches the second threshold.

* * * * *